United States Patent [19]

Fujii

[11] 4,138,940
[45] Feb. 13, 1979

[54] APPARATUS FOR REMOVING CALYXES AND THE LIKE FROM FRUITS

[75] Inventor: Noriomi Fujii, Isahara, Japan

[73] Assignee: Kewpie Kabushiki Kaisha, Tokyo, Japan

[21] Appl. No.: 809,932

[22] Filed: Jun. 24, 1977

[30] Foreign Application Priority Data

Jul. 15, 1976 [JP] Japan .................................. 51-83494
Oct. 29, 1976 [JP] Japan ................................ 51-129383

[51] Int. Cl.² ...................... A23N 15/02; A47J 21/00
[52] U.S. Cl. ........................................ 99/636; 99/640; 99/643
[58] Field of Search ................ 99/585, 635, 637, 640, 99/643, 636; 100/211; 15/3.15; 198/624, 342

[56] References Cited

U.S. PATENT DOCUMENTS

| | | | |
|---|---|---|---|
| 1,448,532 | 3/1923 | Harding | 99/585 |
| 2,023,163 | 12/1935 | Burr | 15/3.15 |
| 2,383,268 | 8/1945 | Morgan | 99/640 |
| 2,707,982 | 5/1955 | Magnuson | 99/640 |
| 2,801,659 | 8/1957 | Carter | 99/585 |
| 3,103,240 | 9/1963 | Minera | 99/640 |
| 3,176,739 | 4/1965 | Minera | 99/640 |
| 3,519,049 | 7/1970 | Tomelleri | 99/640 |
| 3,747,515 | 7/1973 | Petrics | 99/640 |
| 3,963,117 | 6/1976 | Nausedas | 198/342 |

*Primary Examiner*—Harvey C. Hornsby
*Assistant Examiner*—Timothy F. Simone
*Attorney, Agent, or Firm*—Oblon, Fisher, Spivak, McClelland & Maier

[57] ABSTRACT

Several pairs of slender rolls having metal core shafts and resiliently soft outer coverings are disposed parallelly to each other and with an inclination in their longitudinal direction relative to the horizontal direction and submerged in water in a tank, into which berries with adhering calyxes are fed, guided toward the tank bottom, and released to float upward and along the lower surfaces of the rolls, each pair of which is pressed against each other and driven to rotate in opposite directions such that their surfaces in contact move upward. The calyxes of the berries, which are easily dispersed and rotated in the water, are caught between the pairs of rolls and are completely clamped thereby and finally plucked off from the pericarps of their berries.

7 Claims, 17 Drawing Figures

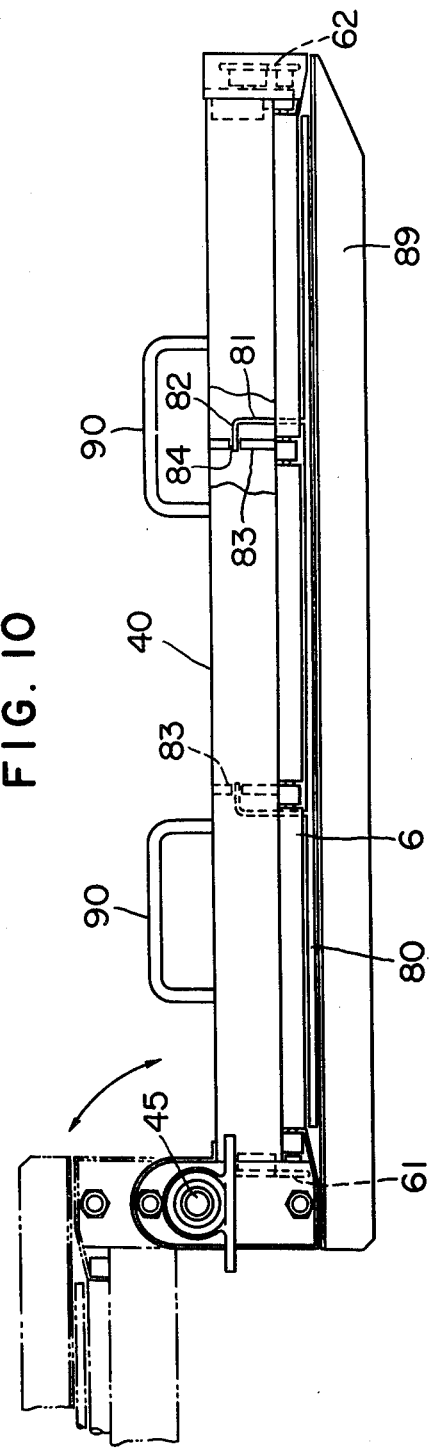
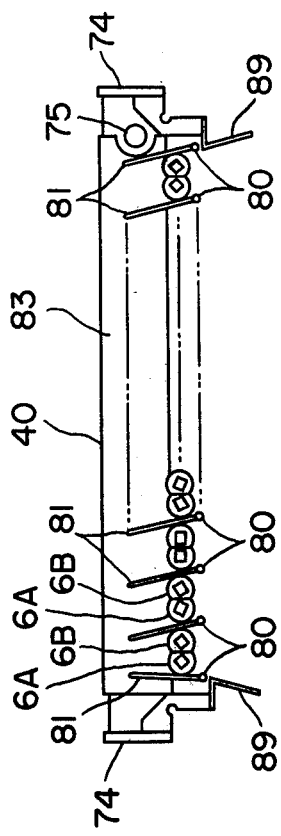

APPARATUS FOR REMOVING CALYXES AND THE LIKE FROM FRUITS

BACKGROUND OF THE INVENTION

1. Field of the Invention:

This invention relates generally to hullers, destemmers, and like apparatuses for removing upwanted parts such as hulls and calyxes from fruits and the like. More particularly, the invention relates to an apparatus for removing hulls, receptacles, involucres, and calyxes (hereinafter referred to as "calyxes") from the pericarps of strawberries and the like (hereinafter referred to collectively as "berries") in a positive and reliable manner irrespective of the shapes and sizes of the berries and the state of adherence of their calyxes.

2. Description of the Prior Art:

In a typical apparatus known heretofore for removing calyxes from berries, a plurality of pairs of parallel rolls are provided horizontally or with a slight inclination, adjacent rolls being rotated in mutually opposite directions, and berries with their calyxes are fed onto these rolls. Furthermore, in order to increase the chances of the calyxes being caught between the rolls, means are provided to increase the frictional force of the cylindrical surfaces of the rolls in some of these apparatus, and, further, swinging brushes are separately provided above the rolls in other apparatuses to thereby impart rolling rotation to the berries.

In this known apparatus, however, it is very difficult to impart rotation smoothly to all of the berries on the rolls and to cause their calyxes to bite into the spaces between the rolls since the berries from which their calyxes are to be removed are not necessarily of spherical shape which is easily rotated, and, moreover, their sizes are not uniform in most cases. Furthermore, the berries on the rolls cannot be easily moved in an intended direction even when they are pushed by a pushing mechanism because of interference mutually between individual berries.

Consequently, not only is efficient removal of the calyxes impossible, but the pericarps or bodies of the berries are easily damaged during the calyx removal work because of the fragile nature of the pericarps.

Furthermore, in the above described known apparatus, even when the calyx of a berry is caught between a pair of rolls, there is a tendency of only one part of the calyx to be thus caught between the rolls because the contact mutually between the rolls is a line contact. Consequently, when the calyx is ripped off from the pericarp, a part of the calyx is left on the fruit.

In view of this problem, there have been apparatuses in which the part of each fruit where the calyx is adhering is cut together with a part of the pericarp by means of a cutting tool at the time when the calyx is caught between the rolls thereby to remove the calyx completely as disclosed in the specification of U.S. Pat. No. 3,519,049. By an apparatus of this type, however, the net yield is poor because a considerable quantity of the pericarp of each fruit is cut away.

SUMMARY OF THE INVENTION

This invention is based on my observation that berries have a slight buoyancy in water since their specific gravity is of the order of 0.9 irrespective of their size, that, even when a large quantity of berries are supplied at one time into water, their mutual dispersion is good, and, moreover, each berry can be very easily rotated by a slight force, that, by utilizing the buoyancy of the berries and flow of water, the berries can be readily moved in a desired specific direction, and that the calyxes become readily removable in water. These features of berries are utilized in the apparatus of this invention.

According to this invention, there is provided an apparatus for removing calyxes from the pericarps of fruits which comprises: a water tank containing water into which the fruits with adhering calyxes are fed, a plurality of pairs of rotatably supported, calyx removing rolls submerged in the water, the rolls of each pair being substantially parallel and in contact with each other; motive power generating and transmitting means for rotating the rolls of each pair in opposite rotational directions, the rolls of each pair operating to catch therebetween the calyxes of the fruits moving in the water and contacting the rolls on that side of the pair where the surfaces of the rolls are moving convergently toward each other and thereby to remove the calyxes from the calyxes from the pericarps of the fruits by a clamping and plucking action, and means for causing the fruits to thus move and contact the rolls.

BRIEF DESCRIPTION OF THE DRAWINGS

Various other objects features and attendant advantages of the present invention will be more fully appreciated as the same becomes better understood from the following detailed description when considered in connection with the accompanying drawings in which like reference characters designate like or corresponding parts throughout the several views, and wherein:

FIG. 10 is a side elevation of the same frame structure;

FIG. 11 is a section taken along the plane indicated by line XI—XI in FIG. 9 as viewed in the arrow direction;

DETAILED DESCRIPTION OF THE PREFERRED EMBODIMENTS

Figure 1:
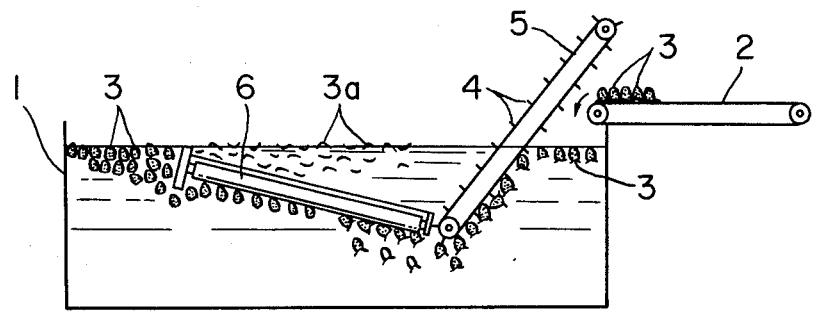
FIG. 1 is a diagrammatic side elevation showing the general arrangement of an example of the apparatus according to this invention.

The features of principle of the apparatus of this invention are indicated in FIG. 1. A water tank 1 containing water has an upstream receiving end over which the delivery end of a berry feeding conveyer 2 extends. The water tank 1 is provided therein with a guiding conveyer 5 disposed at a position to confront the delivery end of the berry feeding conveyer 2 and inclined to extend downward in the downstream direction, whereby the downstream half of this conveyer 5 is submerged in the water in the tank 1. This guiding conveyer 5 is provided with outwardly extending blades 4, 4 for guiding berries 3 with calyxes attached thereto into the water, these berries having been fed by the feeding conveyer 2 into the tank 1 to float on the water therein in a region in front of and below the guiding conveyer 5.

Downstream from the lower end of the guiding conveyer 5, there is provided a group of pairs of calyx removing rolls 6, 6 in substantially parallel arrangement with their upstream ends in the vicinity of the lower end of the guiding conveyer 5. These rolls 6, 6 are so supported that at least their lower surfaces are submerged in the water in the tank 1. The two rolls in each pair are adapted to contact each other at their cylindrical surfaces.

Figure 2:
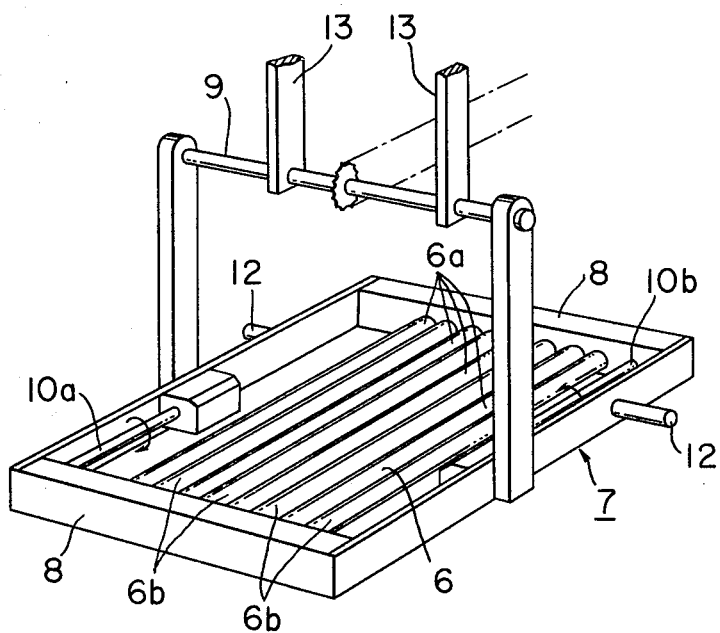
FIG. 2 is a perspective view of one example of means for supporting rolls for removing calyxes.
Figure 3:
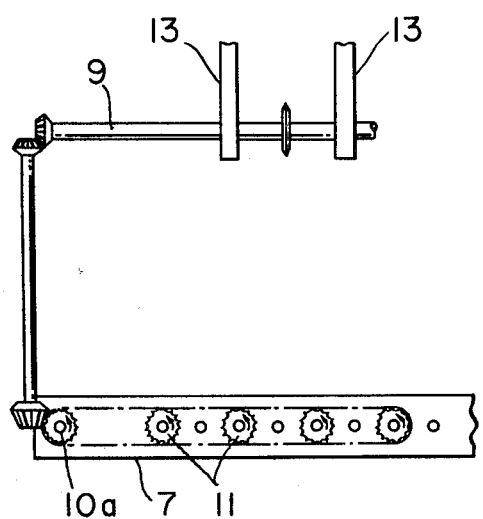
FIG. 3 is a view, with parts cut away, showing one example of means for transmitting rotation to the rolls shown in FIG. 2.

These calyx removing rolls 6, 6 are rotatably supported at their ends by front and rear transverse frame members 8, 8 of a frame 7 as shown in FIG. 2 and are adapted to be driven in rotation at the ends of their shafts. These rolls 6, 6 are thus driven by a power transmission mechanism as shown in FIG. 3 illustrating only one lateral side of the mechanism. Motive power from a motor (not shown) is transmitted to a drive shaft 9 and thence through transmission means such as bevel gears to left and right output shafts 10a and 10b to impart thereto rotation of respectively opposite direction.

Sprocket wheels 11 are fixed to an end of one output shaft 10a and to one end of the shaft of one roll 6a of each pair of calyx removing rolls 6, 6, the sprocket wheels 11 associated with to the output shaft 10a all lying in a single common plane and being intercoupled by an endless chain thereby to rotate in the same arrow direction. Similarly, the other output shaft 10b is intercoupled by an endless chain and sprocket wheels to the other rolls 6b respectively of the pairs of rolls 6, 6 to rotate these rolls 6B in the same arrow direction, which is opposite to that of the rotation of the rolls 6a. The calyx removing rolls 6, 6 of each pair are thus rotated in mutually opposite directions such that, as indicated in cross sectional view as in FIG. 5, the left-hand and right-hand rolls respectively rotate counterclockwise and clockwise. That is, the rolls both move upward at their parts in mutual contact.

The above described frame 7 is pivotally supported on the water tank 1 by coaxial trunnions 12, 12 fixed to the frame 7 and extending laterally and outwardly therefrom. Suspension members 13, 13 are provided to suspendedly support the aforementioned drive shaft 9 at a position offset from the centerline of the trunnions 12, 12. Accordingly, by adjustably setting the height position of the suspension members 13, 13, the frame 7 can be fixed horizontally or with a specific angle of inclination.

The material of the two rolls 6, 6 of each pair of calyx removing rolls may be selected from metals, rubbers, and expanded or foamed materials, both rolls being of the same material or of different materials. These materials may be used in combinations thereof in the rolls.

The apparatus of the above described general construction according to this invention operates as follows.

Berries 3 with attached calyxes fed by the feeding conveyer 2 drop into the receiving end of the water tank 1 and, since their specific gravity is of the order of approximately 0.9 irrespective of their sizes, float in a mostly submerged state at the water surface in the tank 1. These floating berries 3 are successively swept downward into the water and downstream by the blades 4, 4 of the guiding conveyer 5 and are thus guided in a suitably dispersed state without mutual jamming or clogging toward the region below the lower surfaces of the calyx removing rolls 6, 6 at their upstream ends. These rolls 6, 6 are driven in rotation in the manner already described above by a motor (not shown).

Figure 5A:
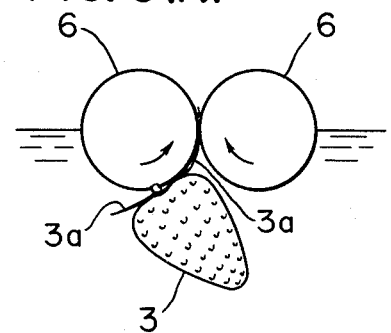
FIGS. 5(A) and 5(B) are elevations respectively showing states of removal of a calyx by calyx removed rolls.
Figure 5B:
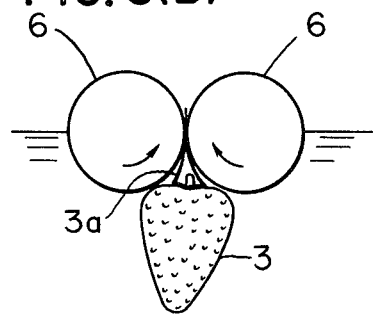

Consequently, when each of the berries 3 thus guided to the region below the calyx removing rolls 6, 6 contacts the cylindrical surface of a roll 6, it is easily rotated by the very small friction force developed therebetween. As a result of this rotation of the berry 3, the occasions for the berry 3 to contact the mutually contacting parts of the rolls 6, 6 become numerous. For this reason, as the berry 3 rises, as it rotates, along the sloped lower surface of the calyx removing rolls 6, 6, its calyx 3a is caught and drawn in by the mutually contacting parts of the rolls 6, 6 as indicated in FIG. 5(A) and is pulled off from the berry 3 by the squeezing and plucking action of the mutually contacting and rolling surfaces of rolls 6, 6.

Each berry 3 from which its calyx 3a has thus been removed floats up from the downstream end of the rolls 6, 6 to the water surface in a region thereof near the downstream end of the tank 1. On the other hand, the calyxes thus removed pass through between the rolls 6, 6 and collect in the region above the rolls 6, 6. These calyxes 3a and the berries 3 without calyxes are collected and taken out of the water tank 1 by suitable respective means, the berries being conveyed to their succeeding processing step.

In the above described operation, when, as a result of various conditions such as the characteristics, sizes, and shapes of the berries 3 with attached calyxes, and in view of the speed of floatation of the berries along the lower surface of the calyx removing rolls 6, 6 and the state of removal of the calyxes 3a, the speed of floatation is excessively high, and the proportion of removal of the calyxes 3a drops, the suspension members 13, 13 of the frame 7 supporting the rolls 6, 6 are raised to decrease the inclination of the rolls 6, 6 thereby to prolong the time of residence of the berries below the calyx removing rolls 6, 6. On the other hand, when the floatation speed is excessively low, the optimum calyx removing action can be imparted to the berries by adjusting the suspension members 13, 13 to increase the inclination of the frame 7.

Figure 4:
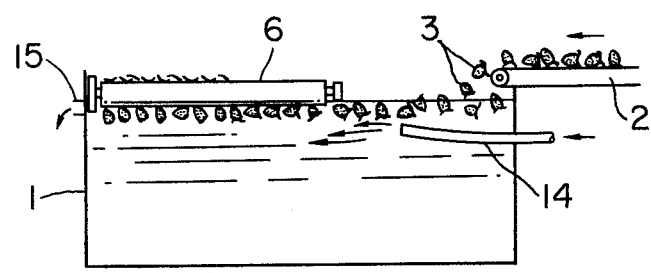
FIG. 4 is a diagrammatic side elevation similar to FIG. 1 showing the general arrangement of another example of the apparatus of the invention.

In a speed example of the apparatus according to the invention as illustrated in FIG. 4, the guiding conveyer 5 of the preceding example shown in FIG. 1 is replaced by one or more water ejecting nozzles 14, and calyx removing rolls 6, 6 are disposed horizontally within the water tank 1 at the water surface thereof, a water overflow outlet 15 being provided in the wall of the tank 1 downstream from the downstream ends of the rolls 6, 6.

In this embodiment of the invention, the berries 3 with attached calyxes 3a dropping into the water tank 1 from the berry feeding conveyer 2 are swept to the region below the calyx removing rolls 6, 6 by a water stream ejected by the one or more ejection nozzles 14. The berries 3 with calyxes are thus caused to move by the water stream toward the downstream end of the rolls 6, 6 as rotation is imparted to the berries similarly as in the case of the preceding embodiment of the invention, and during this movement of the berries 3, removal of their calyxes 3a is carried out.

The surplus water due to the ejection of water through the nozzle or nozzles 14 overflows through the water overflow outlet 15, whereby the quantity of water in the water tank 1 is always maintained constant. Furthermore, this water overflow outlet 15 may be utilized to collect the berries 3 from which their calyxes 3a have been removed. The residence time of the berries 3 in the region below the rolls 6, 6 can be selected as desired by adjusting the flow rate of water ejected through the nozzle or nozzles 14. In the case of a water tank 1 of narrow width, only one pair of calyx removing rolls 6, 6 may be sufficient instead of a plurality of pairs as in the above described examples.

Figure 6A:
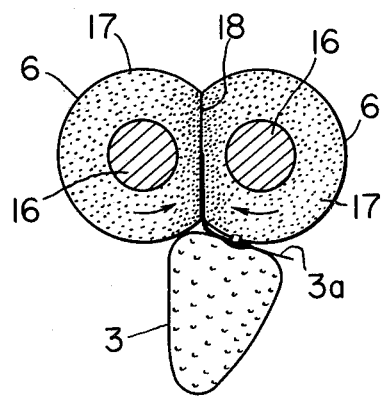
FIGS. 6(A) and 6(B) are elevations showing another example of calyx removing rolls and respectively showing states of removal of a calyx.
Figure 6B:
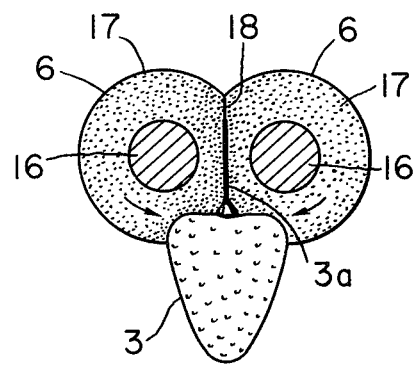

Furthermore, in each of the above described examples of the apparatus of the invention, the calyx removing rolls 6, 6 may have a construction as shown in FIG. 6 comprising shafts 16, 16 made of a hard material and constituting cores and foamed roll structures 17, 17 made of a synthetic resin such as polyurethane or an air-containing rubber and secured coaxially around the shafts 16, 16. These rolls 6, 6 are rotatably supported in a mutually pressed state thereby to form a mutually contacting part 18 which is a surface contact. By this construction, the distance from the peripheral surface of the two rolls to the contacting part 18 between the foamed roll structures 17, 17 is reduced, whereby the catching of the calyx 3a of a berry 3 by the rolls is facilitated, and, at the same time, a high contact pressure between the contacting surfaces of the rolls is obtained at the central part therebetween where the distance between their shafts 16, 16 is the shortest, whereby an excellent action of squeezing and plucking off the calyx 3a from each berry is produced.

A specific example of the apparatus of the invention in concrete form will now be described with reference to FIGS. 7 through 17.

Figure 7:
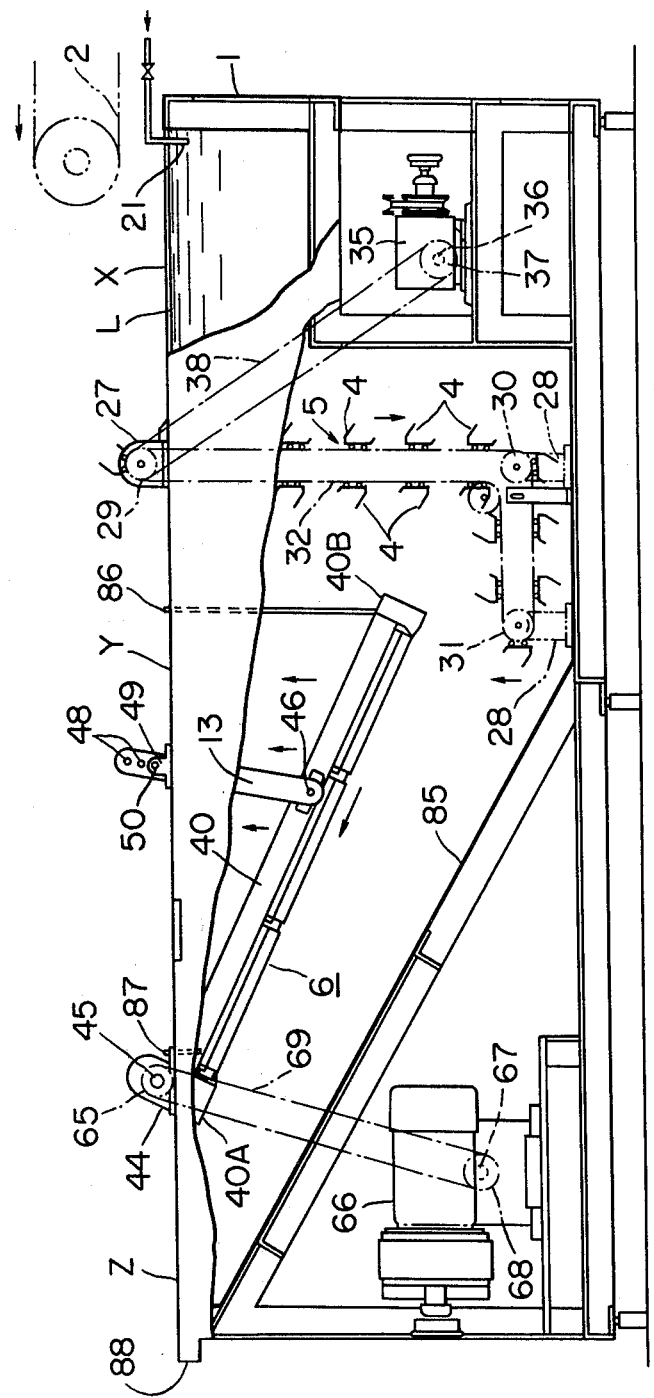
FIG. 7 is a side elevation, with parts cut away, showing the essential construction of another example of the calyx removing apparatus according to the invention.
Figure 8:
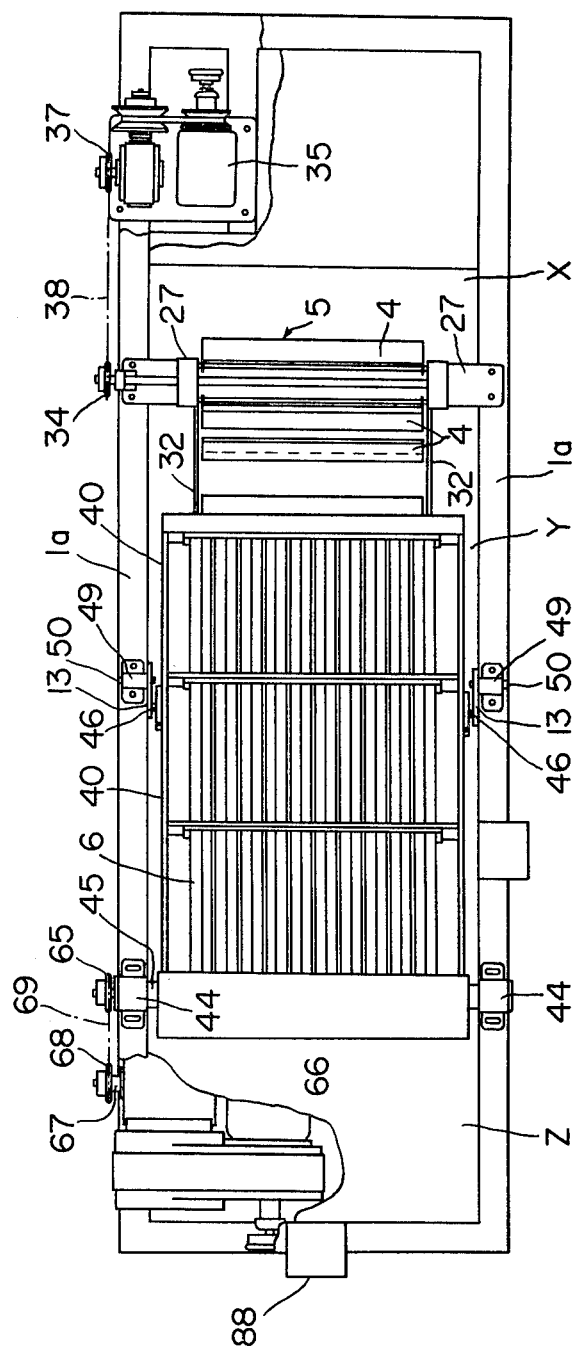
FIG. 8 is a plan view, with parts cut away, of the apparatus shown in FIG. 7.

Referring first to FIGS. 7 and 8, the calyx removing apparatus shown is provided with a water tank 1 filled with water, a berry feeding convyer 2 having a downstream end extending over the upstream end of the water tank 1, a guiding conveyer 5 provided within the water tank 1 at a position near the downstream end of the berry feeding conveyer 2, and a calyx removing roll mechanism disposed within the water with its upstream end above the downstream end of the guide conveyer 5. Water is supplied into the tank 1 through an inlet 21 of a water supply pipe.

As shown in FIGS. 7 and 8, the guide conveyer 5 has sprockets 29, 30, and 31 rotatably supported in left and right symmetrical opposition by bearings 27, 27 on the left and right above the upper opening of the water tank 1 at a position separated from the downstream end of the berry supply conveyer 2 and bearings 28, 28 provided on both lateral sides above the bottom of the water tank 1. Around these sprockets, left and right endless chains 32, 32 are passed, and onto the outer sides of these chains 32, 32 are secured blades 4, 4 resembling venetian blind slats with a specific spacing, these blades 4, 4 transversely spanning the space between the chains 32, 32 and being inclined with their outer edges toward the direction of advance of the chains.

A sprocket 34 is fixed to the end of the shaft of the sprocket 29 provided above the upper part of the water tank 1 and is coupled by an endless chained 38 to a sprocket 37 fixed to a drive shaft 36 of a motor 35 installed outside of the water tank 1. The motor 35 and chain drive is adapted to derive the guiding conveyer 5 in the arrow direction.

Figure 9:
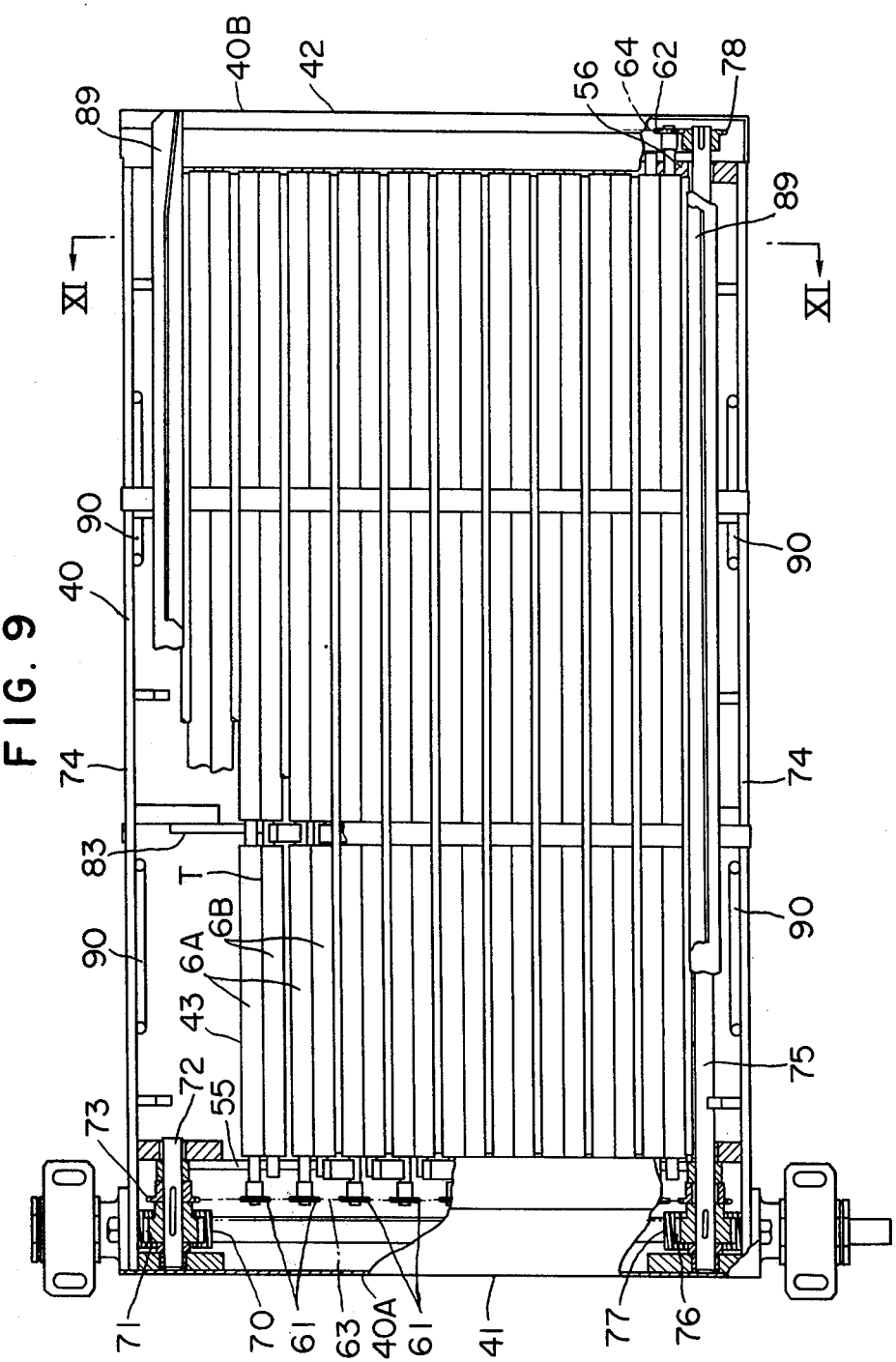
FIG. 9 is plan view of a frame structure in the apparatus shown in FIGS. 7 and 8.

As shown in FIGS. 9 and 10, the principal parts of the calyx removing roll mechanism are a frame structure 40 having a maximum width such that, when the frame structure is installed within the water tank 1, the frame lateral members will be as close as possible to the inner surfaces of the lateral walls 1a, 1a of the water tank and calyx removing rolls 6 rotatably supported at their front and rear ends respectively by the front and rear transverse members 41 and 42 of the frame structure 40. These calyx removing rolls 6 comprise a group of rolls 6A, 6B in a plurality of pairs thereof, each pair comprising a roll 6A and a roll 6B.

Referring again to FIGS. 7 and 8, the front or downstream part 40A of the frame structure 40 remote from the guiding conveyer 5 is rotatably supported by a transverse shaft 45 passed through and rotatably supported by bearings 44, 44 respectively mounted on the upper rims of the lateral walls 1a, 1a of the water tank 1. The other rear or upstream part 40B of the frame structure 40 is disposed at a position near and above the downstream end of the guiding conveyer 5. Moreover, the frame structure 40 is pivotally supported on both lateral sides at a part thereof near its middle part by pins 46, 46 passed through holes in the lower ends of suspension members 13, 13. These suspension members 13, 13 are provided at their upper parts with respective rows of holes 48, 48, through which pins 50, 50 passed through bearings 49, 49 are selectively passed to adjust the inclination of the frame structure 40 to a desired angle.

Figure 12:
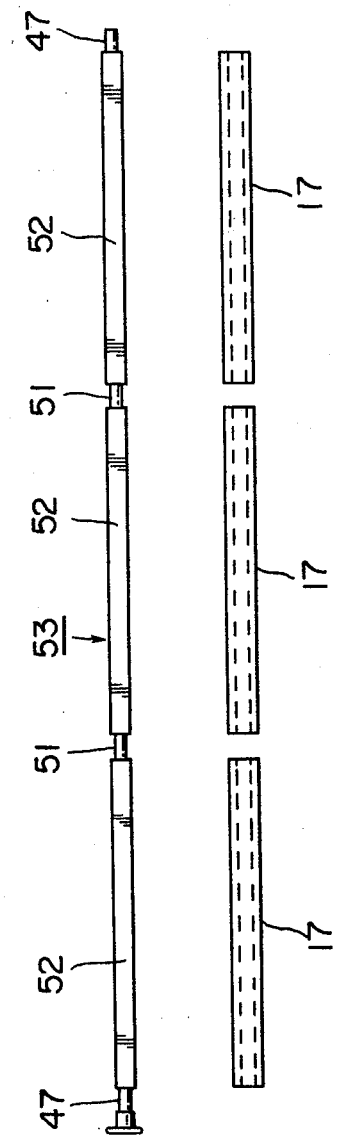
FIG. 12 is a plan view showing a calyx removing roll in disassembled state.
Figure 13:
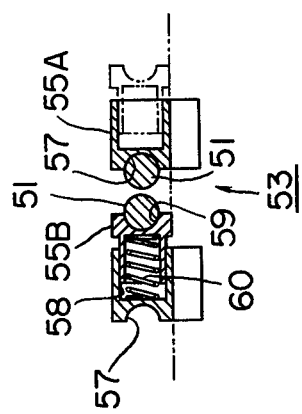
FIG. 13 is a sectional view showing a bearing part of the roll.

As shown in FIG. 12, each of the calyx removing rolls 6 comprises a roll shaft 53 made of a hard material such as a metal and three cylindrical foam material rolls 17, 17 made of a highly compressible material such as sponge rubber or natural sponge and covering the roll shaft 53. The roll shaft 53 has round (circular cross-section) shaft parts 47, 47 and 51, 51 respectively at its two ends and at parts thereof trisecting its length and square (square cross-section) shaft parts 52, 52 at other parts thereof. The foam material rolls 17, 17 have lengths corresponding to those of the square shaft parts 52, 52. The cross section of the parts of each roll shaft 53 to be covered by the rolls 17, 17 is not necessarily limited to a square but may be of any suitable shape such as a triangle or a pentagon.

The calyx removing rolls 6 of the above described construction are disposed in substantially parallel arrangement in pairs of adjacent rolls and are rotatably supported at their end round shaft parts 47, 47 by bearings 55 and 56 of the front and rear transverse frame members 41 and 42 of the frame structure 40. Each pair of calyx removing rolls 6A, 6B is provided at each end thereof with pressing means for elastically pressing together their foam materials 17, 17 as illustrated representatively by one unit of the pressing means inclusive of the bearing 55 in FIG. 13.

This pressing means has on one side a fixed bearing member 55A having on its inner side a recess 57 of semicircular cross section and on the opposite side a movable bearing member 55B having on its inner side a recess 59 of semicircular cross section opposedly confronting the recess 57 of the fixed bearing member 55A. The movable bearing member 55B at its outer part remote from the bearing member 55A is slidably fitted in a cavity 58 formed in the fixed bearing member 55A of the adjacent pressing means for the adjacent pair of rolls 6A, 6B. This movable bearing member 55B is urged to move toward its corresponding fixed bearing member 55A by a spring 60.

Figure 14:
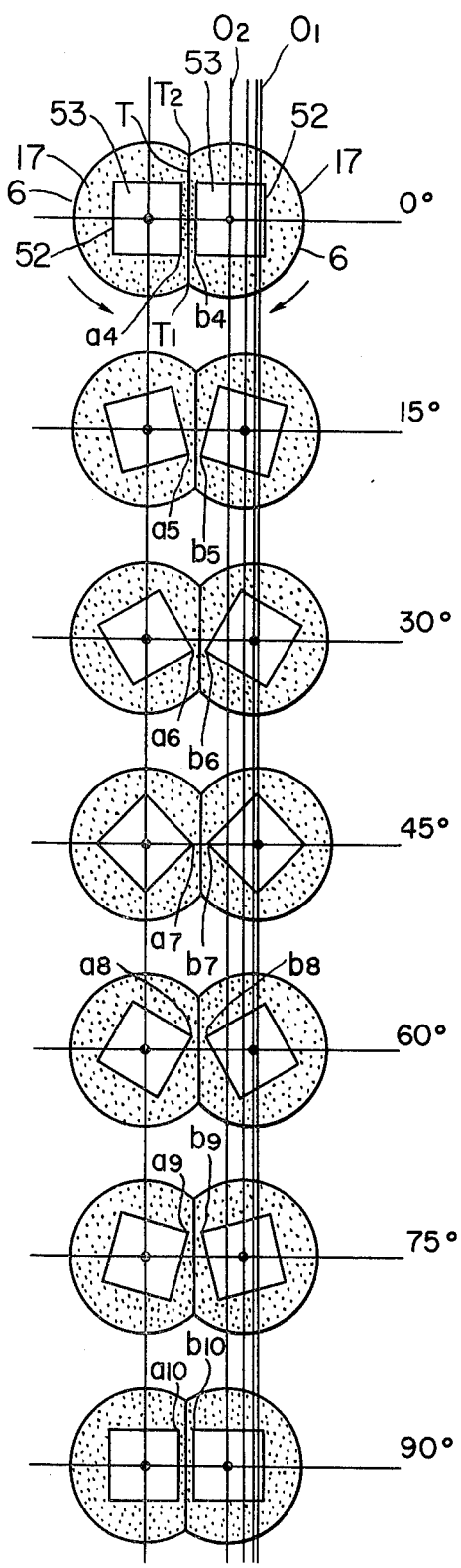
FIG. 14 comprises a series of sectional views respectively showing successive states of rotation of a pair of calyx removing rolls.

The round shaft parts 47, 47 at the ends of the roll shafts 53, 53 of one pair of calyx removing rolls 6A and 6B are fitted into the recesses 57 and 59 of the bearing members 55A and 55B. Then, as a result of the pressing force of the spring 60, the foam material rolls 17, 17 of the pair of calyx removing rolls 6A and 6B are pressed together so that their contacting part T is compressed and assumes the form of a surface contact as indicated in FIGS. 14 and 17.

Referring again to FIGS. 9 and 10, the roll shafts 53, 53 of each pair of calyx removing rolls 6A and 6B are respectively provided at their mutually opposite ends with sprockets 61 and 62. That is, all rolls 6A have respective sprockets 61 fixed to the downstream ends thereof, while all rolls 6B have respective sprockets 62 fixed to the upstream ends thereof. Endless chains 63 and 64 are passed respectively around the sprockets 61, 61 and the sprockets 62, 62.

At the downstream end part 40A of the frame structure 40, a sprocket 65 is fixed to one end of the aforementioned transverse shaft 45. This shaft 45 is driven in rotation by power transmitted from the drive shaft 67 of a motor 66 through a sprocket 68 fixed to the drive shaft 67 through an endless chain 69 passed around the sprockets 68 and the sprocket 65 as shown in FIGS. 7 and 8. As shown in FIG. 9, a worm 70 is fixed to the shaft 45 and is meshed with a worm gear 71 fixed to a shaft 72, to which is also fixed a sprocket 73. The above mentioned endless chain 63 is passed also around this sprocket 73, whereby the power of the motor 66 is transmitted to the calyx removing rolls 6A.

Another worm 77 is fixed to the transverse shaft 45 on the opposite lateral side of the frame 40 from the worm 70 and is meshed with a worm gear 76 fixed to the downstream end of a transmission shaft 75 rotatably supported inside of and parallel to a lateral member 74 of the frame structure 40 and extending from the downstream end to the upstream end of the frame 40. To the upstream end of this shaft 75 is fixed a sprocket 78 coupled by the aforementioned endless chain to the sprockets 62, whereby the power of the motor 66 is transmitted also to the calyx removing rolls 6B, which are thereby caused to rotate in the direction opposite to the rotational direction of the rolls 6A.

Accordingly, the foam material rolls 17, 17 of each pair of calyx removing rolls 6A and 6B move upward at their contact part T. The relative rotational positions of the square shaft parts 52, 52 of each pair of corresponding roll shafts 53, 53 are so preset that, as viewed in cross section, the cross sections of these square shaft parts will always be symmetrical relative to each other as shown in FIG. 14.

At the lower side of the frame structure 40, immediately below each space between adjacent pairs of calyx removing rolls 6A and 6B, there are provided separating rods 80, 80 having a round-bar shape and extending parallelly to and over substantially the entire length of the calyx removing rolls 6A, 6B as shown in FIGS. 10 and 11. These separating rods 80, 80 have suspension rods 81, 81 extending upward through the spaces between adjacent pairs of the calyx removing rolls 6A, 6B. The upper ends of the suspension rods 81, 81 are bent to form bent horizontal parts, which are inserted through respective side holes formed in transverse beams 83, 83 fixed at their ends to the lateral members 74, 74 of the frame structure 40 and spanning the space therebetween. Accordingly, the suspension rods 81, 81 are suspended in a swingable manner.

The bottom of the water tank 1, in its part provided with the calyx removing machanism including the frame structure 40, is formed with an inclined surface 85, which is substantially parallel to the inclination direction of the frame structure 40 as shown in FIG. 7. Furthermore, vertical partition members 86 and 87 made of mesh material, plate material, or fencing material are disposed respectively above the upstream end part 40B and the downstream end part 40A of the frame structure 40 and function to divide the interior of the water tank 1, in its region from its interior to above its water surface L into a zone X for feeding of berries with adhering calyxes, a zone Y for upward flotation of calyxes corresponding to the region above the frame structure 40, and a zone Z for upward flotation of berries from which their calyxes have been removed. At the downstream end of this berry flotation zone Z, the water tank 1 is provided at its upper rim with a flow-out outlet 88 for discharging the berries without calyxes together with overflow of water thereby to collect these berries.

The frame structure 40 is provided at its lateral frame members 74, 74 respectively with guide plates 89, 89, which function to guide the berries conveyed to the region below the upstream end part 40B of the frame 40 by the guiding conveyer 5 into the area where the calyx removing rolls 6 are provided in the frame 40. The frame structure 40 is further provided with grip handles 90, 90 for facilitating holding of the frame structure 40 during changing of the inclination angle thereof.

The calyx removing apparatus of the above described construction according to this invention operates in the following manner.

Preparatory to the start of the actual calyx removing operation, the motor 66 for driving the calyx removing rolls 6 is started, whereupon the power of the motor 66 is transmitted from the drive shaft 67 of the motor through the sprocket 68, the endless chain 69, the sprocket 65 to drive the transverse shaft 45. The rotation of this shaft 45 is transmitted by way of the worm 70 fixed thereto and the worm gear 71 to rotate the shaft 72, and the sprocket 73 fixed to the shaft 72 drives the endless chain 63, which thereby drives the sprockets 61, 61 simultaneously in rotation in the same direction. As a consequence, the calyx removing rolls 6A, 6A to which these sprockets 61, 61 are respectively fixed are driven simultaneously in rotation in the same direction.

At the same time, the above mentioned rotation of the transverse shaft 45 is transmitted through the worm 77 fixed thereto, the worm gear 76, the transmission shaft 75, the sprocket 78, and the chain 64 to drive the sprockets 62, 62 simultaneously in rotation in the same direction, whereby the calyx removing rolls 6B, 6B to which these sprockets 62, 62 are respectively fixed are simultaneously driven in rotation in the same direction which is opposite to that of the rolls 6A, 6A,.

The motor 35 for driving the guiding conveyer 5 is then started, whereupon the guiding conveyer 5 moves in the direction of the arrow.

Then, when the berry feeding conveyer 2 carrying berries with adhering calyxes is operated, the berries are fed and drop from the downstream end of the feeding conveyer 2 into the berry feeding zone X within the water tank 1. The berries which have thus dropped into the water in the zone X are successively swept and guided toward the bottom of the water tank 1 by the blades 4,4 of the guiding conveyer 5 and are released from the downstream end of this guiding conveyer 5. In this case, since the specific gravity of the berries is of the order of approximately 0.9 irrespective of their sizes, the berries, upon being thus released, progressively float upward from the downstream end of the guiding conveyer 5 toward the lower surface of the upstream end part 40B of the frame structure 40.

The berries thus floating upward are all guided by the guide plates 89, 89 provided below the lateral sides of the frame structure 40 into the area between the lateral frame members 74, 74 of the frame structure 40 and are thus brought into contact with the lower surfaces of the calyx removing rolls 6 disposed in parallel arrangement in the frame structure 40 as described hereinbefore. Since the berries readily rotate in the water when only a very slight force is imparted thereto, the berries thus guided to the lower surfaces of the calyx removing rolls 6 suitably disperse without bunching in one place and are thus subjected to the calyx removing process.

Figure 15:
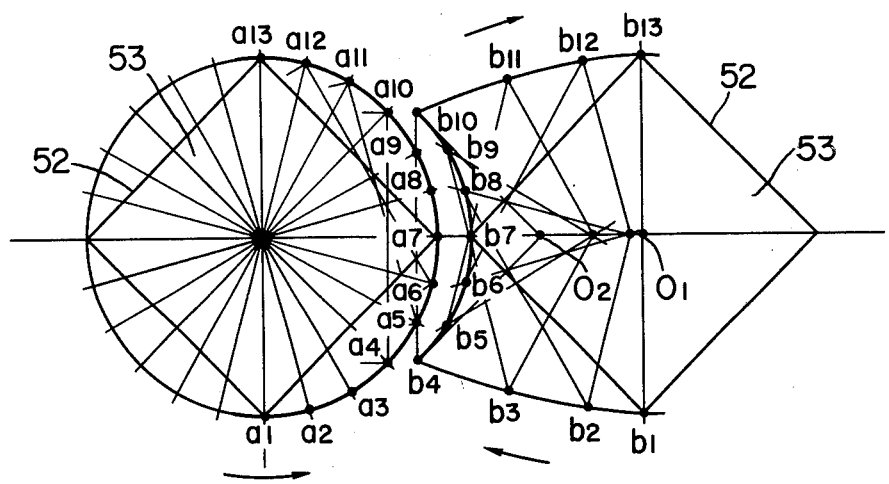
FIGS. 15 and 16 are relatively enlerged geometric diagrams for a description of the rotation of the same calyx removing rolls.
Figure 16:
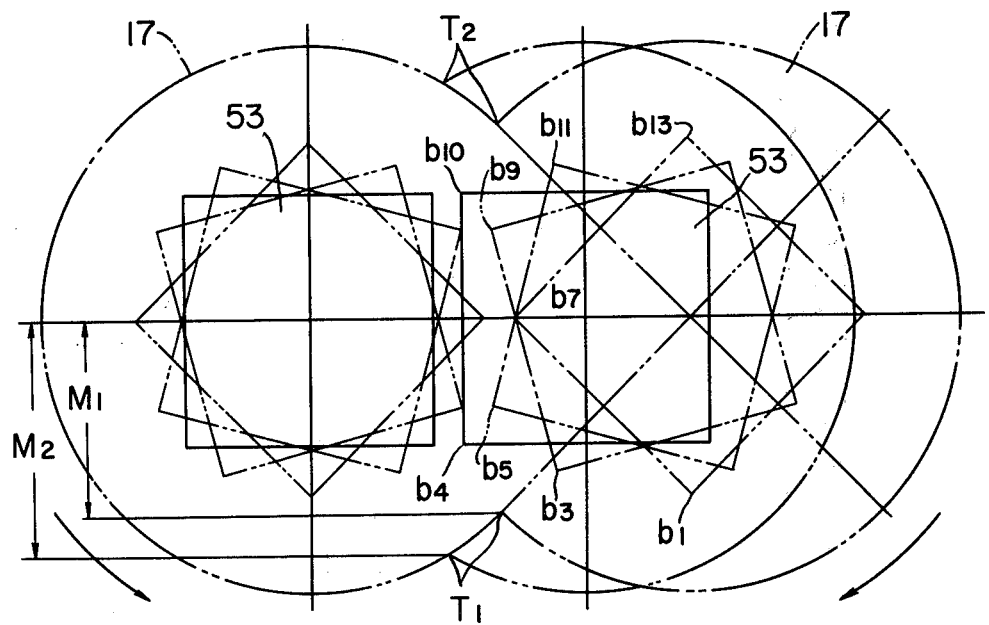

The action of the calyx removing rolls 6, in the case of the above described embodiment of the invention, will now be described analytically and more fully with respect to one pair of the calyx removing rolls 6A and 6B shown in enlarge cross sectional view in FIGS. 15 and 16.

As mentioned hereinbefore, the square shaft parts 52, 52 of the roll shafts 53, 53 of each pair of calyx removing rolls 6A and 6B are so preset in their relative rotational positions that they are continuously or always in symmetrical positional relation to each other as they rotate in their respective mutually opposite directions. At the same time, since the movable bearing member 55B of one of the roll shafts 53, 53 is slidably supported and urged toward its corresponding fixed bearing member 55A by the pressing force of the spring 60, when corresponding corners of the square shaft parts 52, 52 are confronting each other with minimum distance therebetween, the axial center of the calyx removing roll 6B on the movable side is at a point $0_1$ as indicated in FIG. 15, and the distance between the axes of the two rolls 6A and 6B is of maximum value. When the corresponding sides of the square shaft parts 52, 52 are parallelly facing each other, the axial center of the roll 6B on the movable side is at a point $0_2$, and the distance between the axes of the two rolls is of minimum value.

Accordingly, when the roll action is examined with respect to one corner $a_1$ of the square shaft part 52 of the roll 6A on the fixed side, the path of the corner $a_1$ is an arc as traced from $a_1$ through $a_{13}$. On the other hand, the path of the corner $b_1$ corresponding to the above mentioned corner $a_1$ of the square shaft part 52 of the roll 6B on the movable side becomes as indicated by points $b_1$ through $b_{13}$, in which the path part from $b_4$ through $b_{10}$ is substantially parallel to or of the same shape as the path part $a_4$ through $a_{10}$, that is, is a substantially sharply rising path. Furthermore, the contact points of the contacting part T of the foam material rolls 17, 17 vary from T1 to T2 as shown in FIG. 14.

As a consequence of the above described geometrical relationships and actions, the lower contact point T1 of the contacting part T of the foam material rolls 17, 17 of the calyx removing rolls 6A and 6B assumes a position at a distance of M1 or M2 from the axial center positions of the roll shafts 53, 53, that is, it assumes a position near the lower surfaces of the foam material rolls 17, 17. Accordingly, these rolls 17, 17 assume a state wherein the calyxes of the berries are easily entrapped therebetween.

The berries with adhering calyxes supplied to the region immediately below the foam material rolls 17, 17 float upward and contact these rolls 17, 17, whose outer surfaces are rotating toward the lower contact point T1 of the contacting part T. A rotating roll 17 exerts a frictional rotational force on each berry contacting this roll, whereby the berry is easily rotated since there is only a very small difference between the specific gravities of water and the berry, which thereby rotates as it contacts the rotating outer surface of this roll. Then, when the calyx 3a of each berry 3 comes into contact with the lower contact point T1 between these rolls, a part of the calyx 3a is caught and pulled into the contacting part T as indicated in FIG. 17A.

Figure 17A:
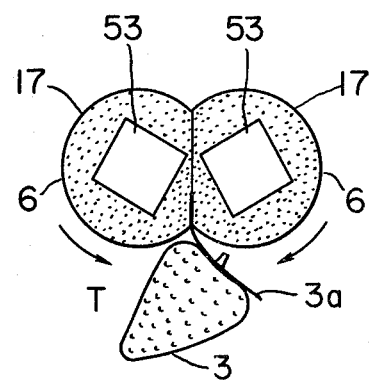
FIGS. 17(A) through 17(D) are sectional views indicating successive states of grasping of a calyx of a berry by a pair of calyx removing rolls.
Figure 17B:
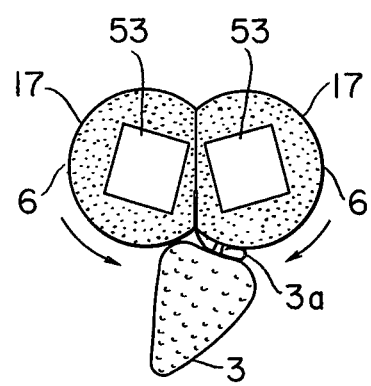
Figure 17C:
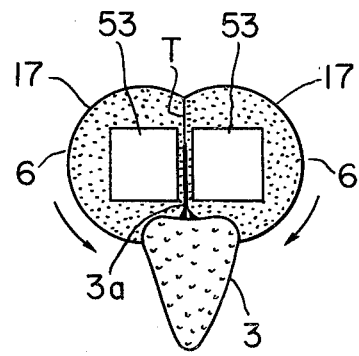

Once a part of the calyx 3a is thus entrapped in the contacting part T, the part of the calyx on the opposite side is also swept up by the rotating outer surfaces of the foam material rolls 17, 17 as indicated in FIGS. 17A, 17B, and 17C, whereby the entire calyx 3a is caught in the contacting part T and clamped between the calyx removing rolls 6A and 6B.

Figure 17D:
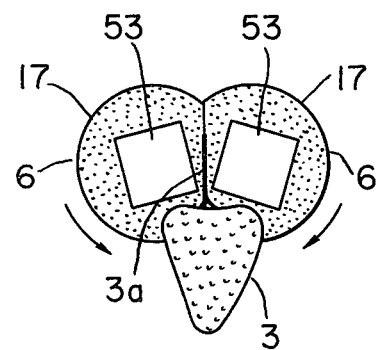

Then, as a result of the maximum clamping action and upward pull due to the corners of the square shaft parts 52, 52 as described hereinafter, the entire calyx 3a is drawn upward. The fleshy body of the berry 3 is also drawn upward, as indicated in FIG. 17D, and is caused to form a depression in the foam material rolls 17, 17 until, finally, the calyx 3a is pulled apart from the fleshy body of the berry 3. The berry 3 from which its calyx 3a has been thus pulled apart is pushed away from the calyx removing rolls 6, 6 by the elastic reactive force of the foam material rolls 17, 17 which have been elastically depressed as mentioned above.

Since the foam material rolls 17, 17, themselves, are soft, the fleshy body of each berry is not damaged during the above described process of calyx removal.

The upward pulling action due to the square shaft parts 52, 52 will now be described more analytically with reference to FIGS. 15 and 17. In the part from positional points $a_4$, $b_4$ to positional points $a_{10}$, $b_{10}$ of a pair of corresponding corners of the square shaft parts 52, 52, the foam material rolls 17, 17 are compressed against each other by the force of the aforedescribed spring 60 and, moreover, trace a substantially upward path as mentioned hereinbefore. Consequently, a calyx which has reached a position between the points $a_4$ and $b_4$ is clamped with great force between the foam material rolls 17, 17 and is drawn upward to a position between the points $a_{10}$ and $b_{10}$. During this upward drawing action, the calyx may slip in some cases, but in such a case, the succeeding corners a and b of the square shaft part 52, 52 arrive as the shafts 53, 53 continue to rotate and carry out the same action, whereby there is no discontinuity in the upward drawing action described above.

It will be obvious that the force with which the calyx removing rolls 6, 6 clamp a calyx can be appropriately adjusted by varying the force of the spring 60 acting on the movable bearing member 55B.

Each calyx which has been pulled off from the fleshy body of the berry by the above described plucking action passes, as it is, upward through the contact part T between the foam material rolls 17, 17 of the calyx removing rolls 6A, 6B and floats upward into the aforementioned zone Y for upward flotation of calyxes above the rolls, and all calyxes thus floating upward are collected and disposed of by suitable means (not shown).

The berries from which their calyxes have been removed as described above move, as they are, along the lower surfaces of the rolls 6, 6 and past the upper end part 40A of the frame structure 40, thus floating upward into the berry floatation zone Z, and then, riding on the over-flowing water, are discharged out of the water tank 1 through the flow-out outlet 88 to be collected by suitable means (not shown).

When, in the above described calyx removing operation, a berry floating upward approaches the space between one pair of rolls 6A, 6B and an adjacent pair, that is, between the roll 6A of one pair and the roll 6B nearest thereto of an adjacent pair, the berry contacts the aforedescribed separating rod 80 provided between the two pairs of rolls and is swept either to the right or to the left. Thus, each berry 3 is always guided to the lower surfaces of one pair of calyx removing rolls 6A, 6B and is subjected to the above described calyx removing process, being prevented from being stalled in the region between two adjacent pairs of rolls.

Furthermore, each berry supplied to the region below a pair of rolls is subjected to the above described action and, in addition, is intermittently pushed from the lateral side by the swinging separating rods 80, 80. Consequently, a berry which is rotating with its calyx directed toward the lateral side is caused to be turned upright with its calyx directed upward.

When, in the above described calyx removing operation, the rate of successful removal of calyxes decreases, and this defective operation is considered to be due to excessively high speed of obliquely upward flotation movement of the berries with calyxes along the lower surface of the rolls 6A, 6B in view of the state of calyx removal because of various conditions such the characteristics, sizes, and shapes of the berries, the stop pins 50, 50 of the suspension member 13, 13 are extracted, and the angle of inclination of the frame structure 40 is varied to determine the angle for optimum movement speed of the berries. The stop pins are then reinserted into the nearest holes for setting this optimum inclination angle of the frame structure 40.

Because of the several novel features of the calyx removing apparatus of this invention as described above, desirable rotation can be imparted to the berries with calyxes irrespective of the shapes, sizes, and surface characteristics of the berries, in contrast to the action carried out in atmospheric air in conventional apparatus, whereby the chances of the calyxes of the berries being caught between the calyx removing rolls are greatly increased. Accordingly, and since this rotation in water of the berries is obtained with only light contact force, there is no possibility of damage to the berries, and, moreover, because this rotation is imparted to the berries in water, a self-washing effect of the berries is achieved.

An important feature of this invention is the construction of the calyx removing rolls, in each of which the radially outer portion is made of a resiliently soft foam material of substantial thickness supported on a roll shaft made of a hard material and having a square cross section in a particularly effective embodiment of the invention. Another significant feature of this invention is the bearing mechanism by which each pair of rolls is supported, in which at least one of the roll shafts is rotatably supported by movable bearings urged by springs toward the other roll shaft, whereby the roll of that shaft is pressed elastically against the opposite roll of the pair. As a result, the calyxes of the berries are positively caught between the calyx removing rolls, and even the root parts of the calyxes are firmly clamped between the rolls to be plucked upward, whereby positive calyx removal is accomplished.

Still another feature of this invention is the provision of the separating rods as described above by which the calyx removing process is made even more efficient. The means by which the angle of inclination of the frame structure and calyx removing rolls supported thereon can be varied thereby to suitably adjust the speed of travel of the berries along the lower surfaces of the rolls as described above to thereby assure positive removal of the calyxes is another important feature of this invention.

While, in the foregoing disclosure, this invention has been described with respect to examples of apparatus for removing the calyxes of strawberries and like berries, the apparatus of this invention can be applied also to the removal of hulls, calyxes, stems, and like unwanted parts of various other fruits such as, for example, cherries. Obviously, numerous modifications and variations of the present invention are possible in light of the above teachings. It is therefore to be understood that within the scope of the appended claims, the invention may be practiced otherwise than as specifically described herein.

I claim:

1. An apparatus for removing calyxes and the like from the pericarps of fruits, which comprises:
   a tank containing therein a fluid such as water into which the fruits with adhering calyxes and the like are fed;
   horizontally extending roll means submerged in the fluid of the tank and adapted for catching calyxes and the like;
   a conveyor for guiding the fruits to be processed to said rollers;
   wherein said roll means includes a plurality of pairs of rotatably supported calyx removing rolls which are inclined in the longitudinal direction thereof relative to the horizontal direction, rolls of each pair being substantially parallel in side by side arrangement, in contact with each other and rotated in opposite directions, and said inclination being made in such a manner that the outlet part of the rolls is higher than the inlet part thereof; and
   driving means for causing opposite rotation of said rolls of each pair while maintaining their inclination states, the fruits being supplied under said inlet part of the rolls by the conveyor such that calyxes and the like of the fruits moving upward along the underside of the rolls while contacting therewith are caught between the rolls of each pair and stripped off by clamping and plucking action during movement of the fruits, and thus processed fruits are removed at an outlet part of the rolls means.

2. An apparatus as claimed in claim 1, wherein: each of said rolls comprises a core shaft having a square cross-section and made of a hard material and an outer roll structure made of a resiliently soft material, said rolls of each pair being supported in a mutually pressed state and rotatable in opposite directions.

3. An apparatus as claimed in claim 1, which further comprises:
means for adjusting inclination degree of the axes of the calyx removing rolls.

4. An apparatus as claimed in claim 1, wherein: the calyx removing rolls are provided with separating rods swingably supported between and substantially parallel to adjacent pairs of the rolls, said rods causing rotation of the fruits with adhering calyxes and urging the same toward the contacting parts of two rolls of each pair of removing rolls.

5. An apparatus as claimed in claim 4, which further comprises means for adjusting inclination degree of the axes of the calyx removing rolls.

6. An apparatus as claimed in claim 1, wherein the conveyor for guiding the fruits to be processed toward the under-side of the calyx removing rolls comprises one or more water fruit ejecting nozzles for guiding the fruits toward the under-side of said rolls.

7. An apparatus as claimed in claim 1, wherein: each of said rolls comprises a core shaft having at least one axial corner portion formed thereon such that each core shaft is preset at relative rotational position such that corresponding corner portions of each of said pairs of rotatably supported rolls are continuously in symmetrical positional relation to each other during rotation in mutually opposite directions.

* * * * *